United States Patent Office 2,801,114
Patented July 30, 1957

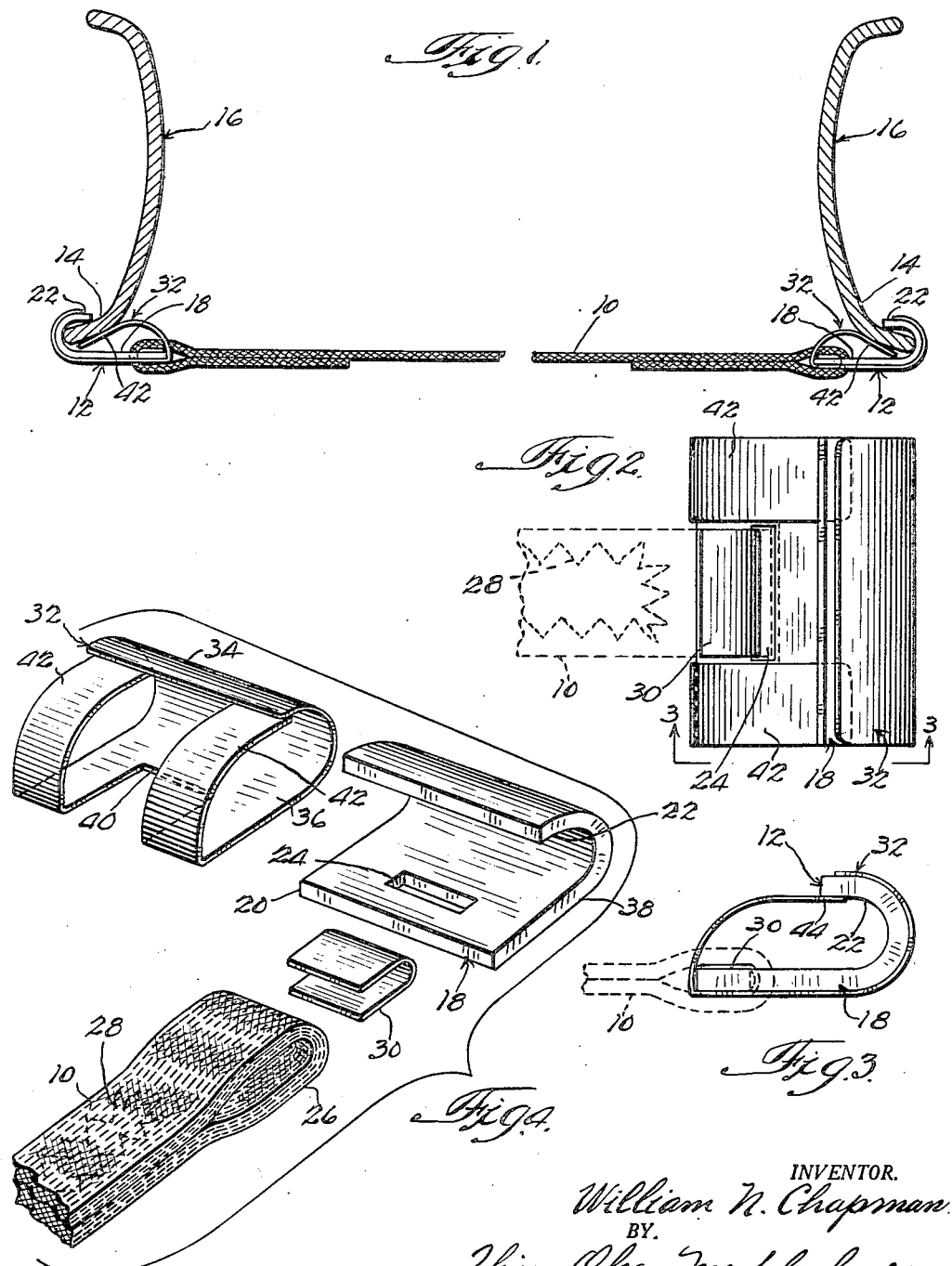

2,801,114

TOWING DEVICE OF THE BUMPER ATTACHED FLEXIBLE LINE TYPE

William N. Chapman, Chicago, Ill., assignor to Phoenix Trimming Company, Chicago, Ill., a corporation of Illinois Application January 11, 1955, Serial No. 481,098

3 Claims. (Cl. 280—480)

This invention relates to towing devices and more particularly to those adapted to be used for coupling two vehicles together by means of a tow line so that one may be towed by the other.

Towing devices, and more particularly those employed to tow one automobile by another automobile, are quite common but a disadvantage frequently encountered in the use of many of such devices is that either the construction which facilitates engagement or disengagement also creates a tendency of the device to become accidentally disengaged when the towing tension is relaxed and a slack develops in the towing line, or that the construction thereof is such that they are difficult to engage and disengage from the respective vehicles.

It is an object of this invention, therefore, to provide a towing device constructed so as to facilitate engagement and disengagement of the towing device from the towing and towed vehicles and at the same time provide against accidental disengagement from the vehicles should a slack develop in the towing line.

It is a further object of this invention to provide such a device which is of simple and relatively inexpensive construction and which may be readily attached and removed from operative engagement with a pair of vehicle bumpers.

It is a still further object of this invention to provide such a device which is light in weight, consists of a minimum number of parts, and which may be conveniently stored away when not in use.

According to one embodiment of this invention, there is provided a towing device for vehicles including a flexible tow line and a clamp member secured to at least one end thereof adapted to embrace a lateral edge of a vehicle bumper, said clamp member comprising a rigid body member and a resilient member embracing said body member, said body member including a shank portion secured to said tow line and a bumper-engaging portion, said resilient member including a pair of spaced-apart resilient fingers normally biased against said bumper-engaging portion and being movable against their bias to permit insertion of said lateral edge between said fingers and said bumper-engaging portion whereby said bias prevents said clamp member from disengaging from said bumper when the tension on said tow line is relaxed.

This invention together with further objects and advantages thereof will best be understood by reference to the following description taken in connection with the accompanying drawing, and its scope will be pointed out in the appended claims.

In the drawing, in which like parts are designed by like reference numerals:

Figure 1 is a side elevational view of the invention in operational engagement with a pair of vehicle bumpers shown in section;

Fig. 2 is a plan view of certain elements of the invention shown in Fig. 1;

Fig. 3 is a side elevational view taken substantially in the direction of arrows 3—3 in Fig. 2; and Fig. 4 is an exploded view in perspective of those elements of the invention shown in Figs. 3 and 4.

As shown in Fig. 1, the invention comprises a flat textile tow line 10, which may be made of nylon, having a pair of clamps 12, which may be made of steel, secured at each end of the tow line whereby the tow line may be extended between and secured to the lateral edge portions 14 of a pair of vehicle bumpers 16. As seen best in Figs. 3 and 4, each clamp 12 comprises a rigid and substantially J-shaped clamp member 18 having a shank portion 20 and a bumper-engaging portion 22. Rigid clamp members 18 should have a sufficient tensile strength to withstand any contemplated towing stress.

As shown in Fig. 4, a transverse slot 24 is provided in the shank portion 20 of rigid clamp member 18 whereby the clamp is secured to the tow line 10 by insertion of an end of the tow line through the slot 24 with the end of the tow line being folded back upon itself to form a loop 26 secured by stitching 28. A chafing member 30, being substantially U-shaped and generally conforming to the inner surface contour of the loop 26 in the tow line, and being receivable in slot 24 (see Fig. 3), is provided in order to reduce the wear on the ends of the tow line during use.

As shown best in Figs. 3 and 4, there is also provided a resilient clamp member 32 having a base portion 34, the interior surface 36 of which substantially conforms to the exterior surface 38 of rigid clamp 18 whereby the rigid clamp member 18 may be received in and snugly embraced by the resilient clamp member 32. A central portion 40 of the resilient clamp member 32 is cut away so that the slot 24 in the rigid clamp member 18 is unobstructed when these two clamp members are assembled together. A pair of resilient fingers 42 are provided on resilient clamp member 32, the resiliency of the fingers being such that the upper extremities 44 thereof (Fig. 3) are normally biased against the bumper-engaging portion 22 of the rigid clamp member 18. Thus, as seen best in Fig. 1, when the lower lateral edge portion of the vehicle bumper 16 is inserted between the resilient fingers 42 and the bumper-engaging portion 22 of the rigid clamp member 18 (by moving the fingers 42 downwardly against their bias to permit said insertion), the bias of the fingers in the direction of the bumper-engaging portion of the rigid clamp member will prevent the clamps 12 from accidentally disengaging from the vehicle bumper when the tension on the tow line during the towing operation is temporarily slackened. It will be understood, of course, that the towing device as described will be equally effective with both clamps secured to the upper lateral edges of the vehicle bumpers.

It will thus be apparent that this invention provides an economical and sturdy towing device so constructed as to facilitate engagement and disengagement of the towing device from vehicles and which, at the same time, provides against accidental disengagement of the towing device from vehicles.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

The invention having thus been described, what is claimed and desired to be secured by Letters Patent is:

1. A towing device for vehicles including a flexible tow line and a clamp member secured to at least one end thereof adapted to engage a lateral edge of a vehicle bumper, said clamp member comprising a rigid body member adapted to withstand towing stresses, said body member including a shank portion secured to said tow line and a bumper-engaging portion, said bumper-engaging portion being substantially wider in the area of said engagement than the width of said tow line, said clamp member also comprising a resilient member embracing said shank and bumper-engaging portions of said body member, the embracing portion of said resilient member having a contour substantially similar to said embraced portions of said body member, said resilient member including a pair of spaced-apart resilient fingers disposed on opposite sides of said tow line and normally biased against said bumper-engaging portion of said body member and being movable against their bias to permit insertion of said lateral edge between said fingers and said bumper-engaging portion whereby said bias prevents said clamp member from disengaging from said bumper when the tension on said tow line is relaxed.

2. A towing device for vehicles including a flexible tow line and a clamp member secured to at least one end thereof adapted to engage a lateral edge of a vehicle bumper, said clamp member comprising a rigid body member adapted to withstand towing stresses, said body member including a shank portion secured to said tow line and a bumper-engaging portion, a slot in said shank portion for receiving a loop in said tow line, said bumper-engaging portion being substantially wider in the area of said engagement than the width of said tow line, said clamp member also comprising a resilient member embracing said shank and bumper-engaging portions of said body member, the embracing portion of said resilient member having a contour substantially similar to said embraced portions of said body member, said resilient member including a pair of spaced-apart resilient fingers disposed on opposite sides of said slot and normally biased against said bumper-engaging portion of said body member and being movable against their bias to permit insertion of said lateral edge between said fingers and said bumper-engaging portion whereby said bias prevents said clamp member from disengaging from said bumper when the tension on said tow line is relaxed.

3. A towing device for vehicles including a flexible tow line and a clamp member secured to at least one end thereof adapted to engage a lateral edge of a vehicle bumper, said clamp member comprising a rigid body member adapted to withstand towing stresses, said body member including a shank portion secured to said tow line and a bumper-engaging portion, a slot in said shank portion for receiving a loop in said tow line and a chafing plate receivable in said loop and said slot to prevent wearing of said tow line, said bumper-engaging portion being substantially wider in the area of said engagement than the width of said tow line, said clamp member also comprising a resilient member embracing said shank and bumper-engaging portions of said body member, the embracing portion of said resilient member having a contour substantially similar to said embraced portions of said body member, said resilient member including a pair of spaced-apart resilient fingers disposed on opposite sides of said slot and normally biased against said bumper-engaging portion of said body member and being movable against their bias to permit insertion of said lateral edge between said fingers and said bumper-engaging portion whereby said bias prevents said clamp member from disengaging from said bumper when the tension on said tow line is relaxed.

References Cited in the file of this patent

UNITED STATES PATENTS

| 1,585,435 | Summers et al. | May 18, 1926 |
| 2,475,280 | Erickson | July 5, 1949 |

FOREIGN PATENTS

| 136,230 | Great Britain | Dec. 8, 1919 |